(12) United States Patent
Geisberger (10) Patent No.: US 9,175,972 B2
(45) Date of Patent: Nov. 3, 2015

(54) ROUTE PLANNING

(71) Applicant: Google Inc., Mountain View, CA (US)

(72) Inventor: Robert Geisberger, Zurich (CH)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/157,913

(22) Filed: Jan. 17, 2014

(65) Prior Publication Data

US 2014/0200807 A1 Jul. 17, 2014

(30) Foreign Application Priority Data

Jan. 17, 2013 (EP) .................................. 13151687

(51) Int. Cl.
*G01C 21/34* (2006.01)
*G06N 5/00* (2006.01)
*G08G 1/0968* (2006.01)

(52) U.S. Cl.
CPC ........ *G01C 21/3492* (2013.01); *G01C 21/3415* (2013.01); *G01C 21/3446* (2013.01); *G06N 5/003* (2013.01); *G08G 1/09685* (2013.01); *G08G 1/096816* (2013.01)

(58) Field of Classification Search
CPC ........... G01C 21/3415; G01C 21/3446; G01C 21/3492
USPC .......................................... 701/414, 423, 533
See application file for complete search history.

(56) References Cited

U.S. PATENT DOCUMENTS

| | | | | |
|---|---|---|---|---|
| 5,610,821 A | * | 3/1997 | Gazis et al. | 455/456.5 |
| 6,317,686 B1 | * | 11/2001 | Ran | 701/533 |
| 6,636,802 B1 | * | 10/2003 | Nakano et al. | 701/532 |
| 8,005,610 B2 | * | 8/2011 | Bast et al. | 701/428 |
| 8,165,107 B2 | * | 4/2012 | Wang | 370/351 |
| 8,290,699 B2 | * | 10/2012 | Horiguchi et al. | 701/409 |
| 8,660,789 B2 | * | 2/2014 | Demiryurek et al. | 701/423 |
| 8,738,559 B2 | * | 5/2014 | Delling et al. | 706/46 |
| 8,762,048 B2 | * | 6/2014 | Kosseifi et al. | 701/410 |
| 8,824,337 B1 | * | 9/2014 | Geisberger | 370/255 |
| 2005/0187702 A1 | * | 8/2005 | Yoshikawa et al. | 701/117 |

(Continued)

FOREIGN PATENT DOCUMENTS

| | | | | |
|---|---|---|---|---|
| EP | 1939590 A1 | * | 7/2008 | G01C 21/34 |
| JP | 09035183 A | * | 2/1997 | |

OTHER PUBLICATIONS

Delling, Daniel et al., "Bidirectional core based routing in dynamic time dependent road networks", ISAAC 2008, LNCS 5369, 2008, Springer-Verlag Lecture Notes in Computer Science, pp. 813-824.*

(Continued)

*Primary Examiner* — Behrang Badii
*Assistant Examiner* — David Testardi
(74) *Attorney, Agent, or Firm* — Dority & Manning, P.A.

(57) ABSTRACT

A computer-implemented route planning method comprises determining source and destination nodes in a graph data structure based on a route planning query, executing an initial graph search on the graph data structure using graph costs based on real-time traffic data, wherein the initial graph search starts at the source node and settles nodes until it stops, and computing one or more routes to the destination node from one or more of said settled nodes using precomputed data based on traffic prediction data, thereby to determine a route from the source node to the destination node via one of said settled nodes.

10 Claims, 4 Drawing Sheets

(56) References Cited

U.S. PATENT DOCUMENTS

| | | | |
|---|---|---|---|
| 2009/0265091 A1* | 10/2009 | Machii et al. | 701/200 |
| 2010/0036606 A1* | 2/2010 | Jones | 701/202 |
| 2011/0113155 A1* | 5/2011 | Kuznetsov et al. | 709/241 |
| 2011/0161261 A1* | 6/2011 | Wu et al. | 706/12 |
| 2011/0251789 A1* | 10/2011 | Sanders et al. | 701/202 |
| 2011/0295497 A1* | 12/2011 | Abraham et al. | 701/200 |
| 2012/0179674 A1* | 7/2012 | Delling et al. | 707/736 |
| 2012/0250535 A1* | 10/2012 | Delling et al. | 370/252 |
| 2012/0254153 A1* | 10/2012 | Abraham et al. | 707/716 |
| 2012/0310523 A1* | 12/2012 | Delling et al. | 701/411 |
| 2014/0107921 A1* | 4/2014 | Delling et al. | 701/533 |
| 2015/0185035 A1* | 7/2015 | Park et al. | 701/423 |

OTHER PUBLICATIONS

Geisberger, Robert, Advanced route planning in transportation networks, Karlsruhe Institute of Technology, Dissertation, Feb. 4, 2011, 227 pages, downloaded from: http://algo2.iti.kit.edu/download/diss_geisberger.pdf.*

Kieritz, Tim et al., "Distributed time dependent contraction hierarchies", SEA 2010, LNCS 6049, 2010, Springer-Verlag Lecture Notes in Computer Science, pp. 83-93.*

Nannicini, Giacomo et al., "Bidirectional A* search on time dependent road networks", 2010, 21 pages, downloaded from: http://citeseerx.ist.psu.edu/viewdoc/summary?doi=10.1.1.185.1647.*

Nannicini, Giacomo, "Point to point shortest paths on dynamic time dependent road networks", École Polytechnique, Thesis, Jun. 18, 2009, 190 pages, downloaded from: https://pastel.archives-ouvertes.fr/file/index/docid/501251/filename/final-thesis.pdf.*

European Search Report (EP 13151687), Jul. 4, 2013—3 pages.

Batz et al., "Algorithm Engineering for Large Graphs: Fast Route Planning", http://algo2.iti.uni-karlsruhe.de/download/trasport-optimization-finland-2009.pdf—36 pages (2009).

Batz et al., "Time-Dependent Contraction Hierarchies and Approximation", 9$^{th}$ International Symposium on Experimental Algorithms (SEA '10), May 20, 2010, http://algo2.iti.uni-karlsruhe.de/download/atch.pdf—72 pages.

Batz et al., "Time-Dependent Contraction Hierarchies and Approximation" Lecture Notes in Computer Science, vol. 6049, May 20, 2010, pp. 166-177.

Batz et al., "Time-Dependent Route Planning with Generalized Objective Functions", 20$^{th}$ European Symposium on Algorithms (ESA '12), Sep. 10, 2012, http://algo2.iti.uni-karlsruhe.de/download/slides_batz_ESA12.pdf—32 pages.

Batz et al., "Time-Dependent Route Planning with Generalized Objective Functions", Lecture Notes in Computer Science, vol. 7501, Sep. 10, 2012, pp. 169-180.

Dibbelt et al., "User-Constrained Multi-Modal Route Planning", Proceedings of the 14$^{th}$ Meeting on Algorithm Engineering & Experiments (ALENEX'12), Jan. 16, 2010, pp. 150-159.

Nannicini et al., "Fast Paths in Large-Scale Dynamic Road Networks", Computational Optimization and Applications, vol. 45, Issue 1, Jan. 2010, pp. 143-158.

Nannicini, "Point-to-Point Shortest Paths on Dynamic Time-Dependent Road Networks", Thèse de doctorat en informatique de l'ècole, polytechnique, Jun. 18, 2009, http://pastel.archives-ouvertes.fr/pastel-00005275-88 pages.

* cited by examiner

ROUTE PLANNING

FIELD

This invention relates to computer-implemented route planning.

BACKGROUND

Computer-implemented route planning methods have been developed which generate a route from a start location to a destination location.

Known route planning methods have a precomputation phase (ie: a computation phase prior to query time) in which map data is processed to form a graph data structure representing possible routes between locations. Costs may be assigned to arcs of the graph to apply weights based on the travel time between locations, and may take into account the distance between particular locations, the type of road, traffic conditions, and other factors which may affect travel time. Costs can alternatively or additionally be assigned to other parts of the graph, e.g: to nodes or subpaths.

Optimal routes may be calculated by way of a graph search algorithm on the weighted graph. Known graph search algorithms include Dijkstra's algorithm and the A* search algorithm, which compute a connected sequence of arcs from a source node to a target node such that the sum of the arc costs is minimal over all such paths.

More recently, speed-up algorithms such as the contraction hierarchies (CH) algorithm have been developed, in which shortest paths (called shortcuts) are precomputed to improve speed at query time. A problem with such speed-up algorithms is that it is necessary to have information regarding arc costs at precomputation time, which means that it is not possible to account for real-time traffic conditions.

It has been proposed to take real-time traffic data into account by way of a Dijkstra-based search at query time, with costs on the graph determined based on the real-time traffic data. However, this approach does not scale to large graphs, because the query computation time becomes unacceptable long.

SUMMARY

The present invention provides a computer-implemented route planning method, comprising: determining source and destination nodes in a graph data structure based on a route planning query, executing an initial graph search on the graph data structure using graph costs based on real-time traffic data, wherein the initial graph search starts at the source node and settles nodes until it stops, and computing one or more routes to the destination node from one or more of said settled nodes using precomputed data based on traffic prediction data, thereby to determine a route from the source node to the destination node via one of said settled nodes.

The present invention also provides a system, comprising: one or more communication modules for communication with one or more client devices, a precomputation module configured to generate a graph data structure based on map data, and a query processing module configured to determine source and destination nodes in the graph data structure based on a route planning query, wherein the query processing module comprises a first graph search module configured to execute an initial graph search on the graph data structure using graph costs based on real-time traffic data, wherein the initial graph search starts at the source node and settles nodes until it stops. The query processing module further comprises a second graph search module configured to compute one or more routes to the destination node from one or more of said settled nodes using precomputed data based on traffic prediction data, thereby to determine a route from the source node to the destination node via one of said settled nodes.

The present invention also provides an apparatus comprising at least one processor and at least one memory storing instructions which when executed by the at least one processor cause the at least one processor to perform the steps of: determining source and destination nodes in a graph data structure based on a route planning query, executing an initial graph search on the graph data structure using graph costs based on real-time traffic data, wherein the initial graph search starts at the source node and settles nodes until it stops, and computing one or more routes to the destination node from one or more of said settled nodes using precomputed data based on traffic prediction data, thereby to determine a route from the source node to the destination node via one of said settled nodes.

BRIEF DESCRIPTION OF THE DRAWINGS

Embodiments of the present will now be described, by way of example only, with reference to the accompanying drawings, in which.

DETAILED DESCRIPTION

A route planning system and methodology is provided which efficiently computes optimal routes between locations whilst taking into account real-time traffic data. In an embodiment, an initial graph search is carried out using graph costs based on real-time traffic data. The initial graph search is stopped when the search is beyond an initial part within which real-time traffic data is considered relevant. Pre-computed data based on traffic prediction data is then used to calculate shortest paths to the destination node from each of the nodes at which the initial graph search was stopped, and the best of these paths is selected as the optimal route.

The initial graph search is stopped based on a preset condition, which is set based on the observation that real-time traffic data is only good to use for some time (e.g: 30 minutes in the future). Precomputed data based on traffic prediction data available at precomputation time is then used for the later part of the route.

Thus, according to various embodiments of the invention, a two-step route planning methodology is provided. In the first step, an initial graph search (e.g: based on Dijkstra's algorithm) is executed for the time that live traffic data is to be used. Then, in the second step, a speed-up technique based on precomputed data is used to compute the part of the route for which traffic prediction data applies.

In various embodiments, a trade-off is made in the selection of the initial graph search algorithm to emphasise flexibility over search speed. Suitable algorithms include Dijkstra's algorithm, the A* algorithm, or any other flexible algorithm in which graph costs can be changed quickly at query time to accommodate costs based on real-time traffic data. According to various embodiments, the initial graph search is a one-to-many graph search.

In the second step, pre-computed data based on traffic prediction data is leveraged to accelerate the computation. The computation for the second step may comprise a hierarchical speed-up technique such as contraction hierarchies (CH) or highway hierarchies (HH), or any other technique in which precomputed data is used to improve computation speed. The CH and HH techniques are known per se to those skilled in the art and will not be described in detail here.

Figure 1:
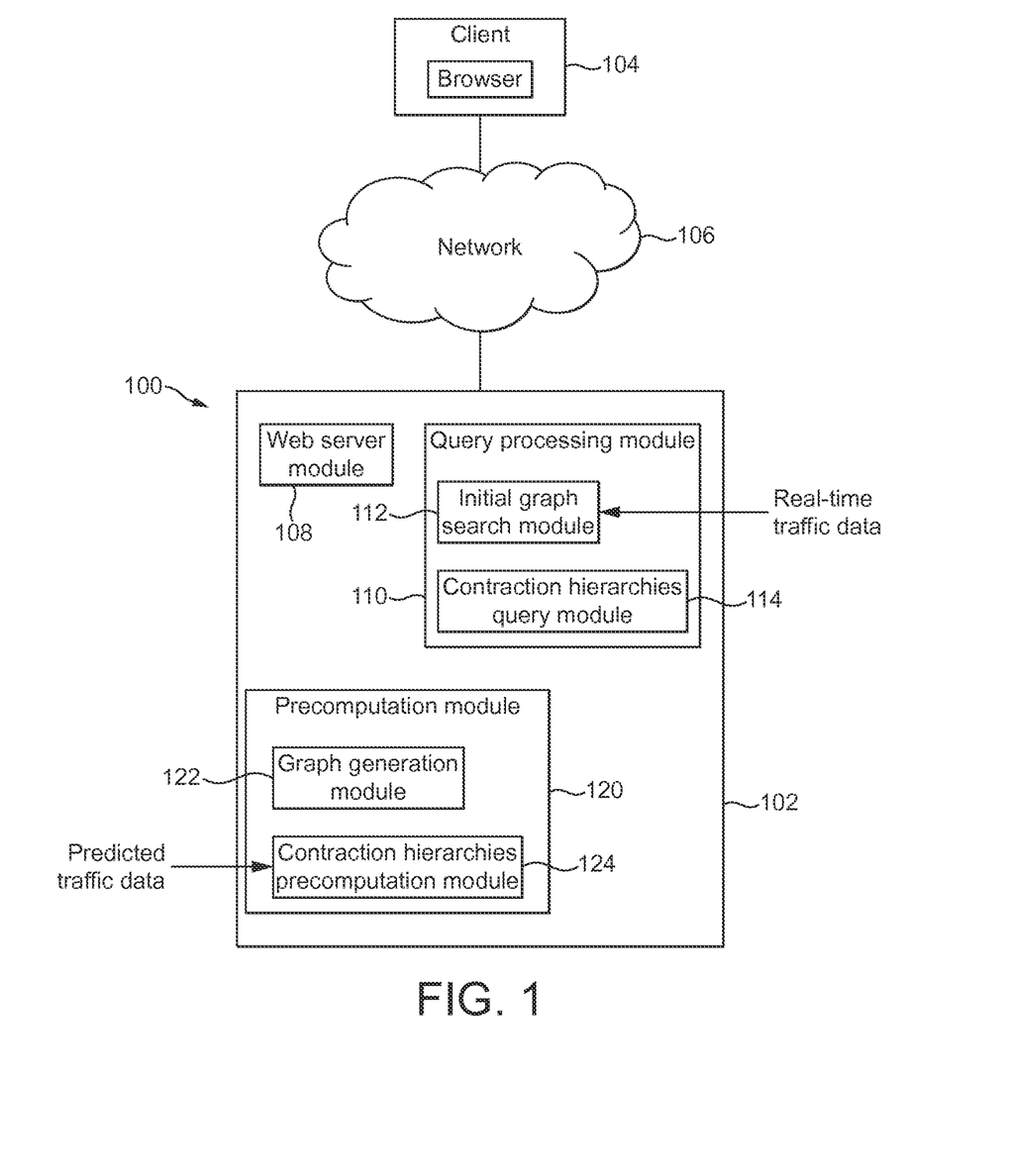
FIG. 1 shows a high level block diagram of a system according to an exemplary embodiment.

FIG. 1 illustrates a high level block diagram of a system 100 according to one exemplary embodiment of the invention. The implementation of FIG. 1 comprises a web application, ie: an application that is accessed by users over a network such as the Internet or an Intranet.

As shown in FIG. 1, the system 100 includes a route planning system 102, which provides route planning information in response to queries from a user client 104. The system 102 is in communication with the client 104 via a network 106, which is typically the internet, but can also be any network, including but not limited to any combination of a LAN, a WAN, a mobile, wired or wireless network, a private network, or a virtual private network. While only a single client 104 is shown in FIG. 1, it is understood that very large numbers (e.g., millions) of clients are supported and can be in communication with the system 102 at any time. Examples of client devices 104 are personal computers, digital assistants, personal digital assistants, cellular phones, mobile phones, smart phones or laptop computers.

As shown in FIG. 1, the route planning system 102 comprises a number of processing modules. It will be appreciated that the term "module" refers to computer logic utilised to provide specified functionality. Thus, a module can be implemented in hardware, firmware and/or software controlling one or more general purpose processors. In one embodiment, the modules are program code files stored on a storage device, loaded into memory and executed, or can be provided from computer program products, for example computer executable instructions, that are stored in a tangible computer-readable storage medium such as RAM, a hard disk or optical or magnetic media.

It will be appreciated that embodiments of the system 102 can have different or other modules to the ones described herein, with the described functionalities distributed amongst the modules in a different manner. Moreover, it will be appreciated that the system 102 may in some embodiments comprise a single server, or may alternatively comprise multiple servers, with functional tasks distributed between those servers. Each server may comprise a single processor, or may comprise an architecture employing multiple processors for increased computing capability.

As shown, the exemplary system 102 of FIG. 1 includes a communication module in the form of web server module 108, which is configured to communicate with the client 104 to deliver web content that can be accessed via the network 106. The content may for example include HTML (hypertext markup language), images, scripting language (e.g: JavaScript, Jscript, Visual Basic Script) and other elements that are used by the browser on the client 104.

Requests from the client 104 for a route from a start location to a destination location are passed to a query processing module 110. The query processing module is responsive to the request to generate one or more routes between the start and destination locations specified in the request. Information relating to the generated routes (e.g: text directions, estimated time of arrival and/or display of the route on a map) is then delivered from the system 102 to the client 104 in accordance with techniques which are well known per se to those skilled in the art.

Query processing module 110 comprises a number of modules which carry out their function at query processing time. In the embodiment of FIG. 1, query processing module 110 includes initial graph search module 112 and contraction hierarchies (CH) query module 114. As shown, the system 102 also includes a precomputation module 120 comprising modules configured to carry out their functionality prior to the time of a query. As shown, precomputation module 120 includes a graph generation module 122 and a contraction hierarchies (CH) precomputation module 124.

Figure 2:
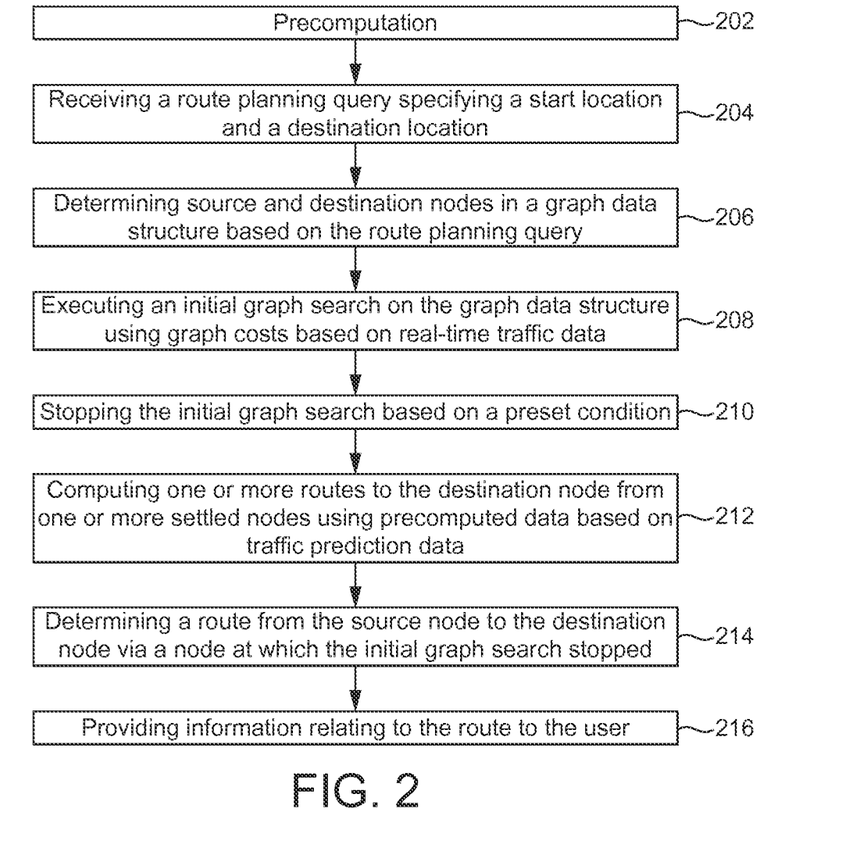
FIG. 2 shows functional steps in the operation of the route planning system.

As shown in FIG. 2, in an embodiment, operation of the route planning system 102 comprises the following functional steps:

202: Precomputation,
204: Receiving a route planning query specifying a start location and a destination location,
206: Determining source and destination nodes in a graph data structure based on the route planning query,
208: Executing an initial graph search on the graph data structure using graph costs based on real-time traffic data,
210: Stopping the initial graph search based on a preset condition,
212: Computing one or more routes to the destination node from one or more settled nodes using precomputed data based on traffic prediction data,
214: Determining a route from the source node to the destination node via a node at which the initial graph search stopped,
216: Providing information relating to the route to the user.

Precomputation

Graph generation module 122 is configured to generate a graph data structure comprising nodes and arcs, based on map data obtained from a map database. This process may be implemented by way of any of various known computational schemes to generate a graph data structure from raw map data. It will be appreciated that the map database may form part of the system 102, or it may form part of a different system.

The contraction hierarchies (CH) precomputation module 124 is configured to generate precomputed data by way of the CH technique, to speed up computation of routes by the system 102. More specifically, the module 120 precomputes shortest paths (called shortcuts) by way of the CH technique, using the graph data structure generated by the graph generation module 122.

As will be appreciated by those skilled in the art, the CH shortcuts are generated in a known manner dependent on graph costs. For a detailed discussion of the CH technique and the generation of shortcuts, reference is directed to, for example, "Contraction Hierarchies: Faster and Simpler Hierarchical Routing in Road Networks", R. Geisberger, P. Sanders, D. Schultes, D. Delling, 7th Workshop on Experimental Algorithms (WEA), May/June 2008, Page(s): 319-333, available online at the time of writing at: http://algo2.iti.kit.edu/english/999.php.

In embodiments of the invention, the costs on the graph used in the CH precomputation take into account predicted traffic data, which may be received by the CH precomputation module 124 as shown in FIG. 1. The predicted traffic data is available to the CH precomputation module 124 at precomputation time, and is used to determine the graph costs for the CH precomputation by the module 120.

The predicted traffic data may be based on past traffic conditions and could for example be determined by time-averaging data relating to vehicle speeds over a suitably long period of time. For example, a time-average may be taken of data relating to the speed of mobile devices (e.g: mobile phones) participating in a crowd-sourcing scheme in which GPS or other location service information is anonymously shared, or a time-average may be taken of traffic flow sensor data from traffic flow sensors at highways or other routes. Predicted traffic data is available from a number of sources, including Google Maps and TomTom HD traffic.

In some embodiments, the predicted traffic data is time independent—ie: the predictions do not change at different times. Those skilled in the art cognizant of the present disclosure will appreciate that in some embodiments, the predicted traffic data may alternatively be time-dependent, ie: the data may specify traffic predictions at different times of day and/or different days. In the case of time-dependent predictions, time averages may be taken for example over traffic data for corresponding time windows (e.g: 09.00 am-10:00 am) during a large number of selected days (e.g: every day for one month, or every Saturday for one year). It will be appreciated that whether the predicted data is time independent or time dependent, it is available at precomputation time, and therefore can be taken into account in the CH precomputation.

It will be appreciated that precomputation by the CH precomputation module 124 may be carried out at set times, for example periodically (e.g: once per week).

Query Time Processing

The query processing module 110 processes user requests for a route from a start location to a destination location and calculates one or more routes using the precomputed data determined by the precomputation module 120. In response to receiving 204 a new query, the query processing module 110 determines 206 source and destination nodes in the graph data structure respectively corresponding to the start and destination locations. Initial graph search module 112 then executes 208 an initial query time graph search on the graph data structure starting at the source node.

The initial graph search uses graph costs based on real-time traffic data. As used herein, the term "real-time" traffic data refers to traffic data obtained for a particular time, and includes "live" traffic data obtained for the time that the query was made, and also real-time traffic data obtained for a time recently before the query was made (e.g: 5 minutes before query time) which is still relevant at query time.

The real-time traffic data is based on traffic conditions at the relevant time, and may be obtained for example from data relating to the speed of mobile devices (e.g: smartphones) participating in a crowd-sourcing scheme in which GPS or other location service information is anonymously shared, or from traffic flow sensor data from traffic flow sensors at highways or other routes. Suitable real time traffic data is available from a number of sources, including Google Maps and TomTom HD.

As shown in FIG. 1, in embodiments the real time traffic data is received by the initial graph search module 112. The real time traffic data may be received by the initial graph search module 112 at intervals, for example every 1 minute.

It will be appreciated that in addition to taking into account real time traffic data, the graph costs for the initial graph search may also account for the distance between particular locations, the type of road, and other factors which may affect travel time.

Figure 3:
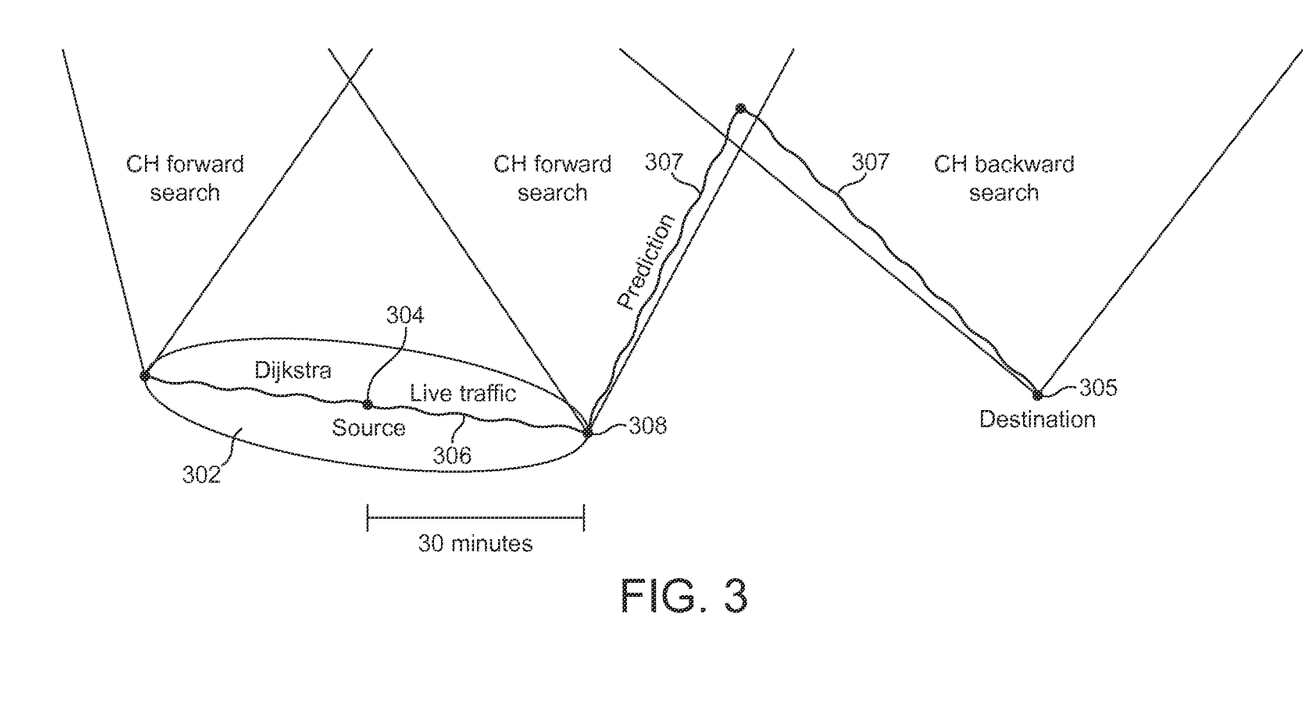
FIG. 3 schematically illustrates a graph search scheme according to an exemplary embodiment.

In the embodiment shown in FIG. 3, the initial graph search comprises a Dijkstra search, and therefore settles nodes in non-decreasing order of the shortest path cost to define a search space 302 which expands outwardly from the source node 304 as the graph search progresses and more nodes are settled. Those skilled in the art will appreciate that alternatively, any other suitable algorithm which can accommodate real-time traffic data could be used for the initial graph search, such as the A* algorithm or other Dijkstra-based algorithm.

The Dijkstra search of FIG. 3 stops when the search is beyond an initial part. The condition for stopping the Dijkstra search is preset based on a heuristic condition that real-time traffic data is only relevant for a limited time. For example, the search may stop where it finds nodes that are more than a preset travel time (e.g: 30 minutes travel time) away from the start location.

Those skilled in the art will appreciate that the destination location could be found during the Dijkstra search if the destination location is sufficiently close to the start location. In this case, the route is determined by the Dijkstra search such that steps 212 and 214 are unnecessary If the destination location is not found during the Dijkstra search, the CH query module 114 computes shortest paths using the precomputed data previously computed by the CH precomputation module 124. More specifically, the CH query module 114 computes 212 shortest paths from each node at which the initial graph search stopped to the destination node. The shortest paths thus determined are then used to select the best route (ie: shortest path) from the source node 304 to the destination node 305 via a node at which the initial graph search stopped, thereby to determine 214 a route.

As shown in FIG. 3, the route from source node 304 to destination node 305 thus comprises a path 306 computed by the Dijkstra search with live traffic and a path 307 computed using precomputed data with predicted traffic. The path 306 computed by the Dijkstra search extends from the source node to an intermediate node 308 at which the Dijkstra search stopped. The path computed using predicted traffic data extends from the intermediate node 308 to the destination node 305.

The CH query module 114 computes 212 shortest paths by analysing CH forward and backward search spaces in a bidirectional search. As shown in FIG. 3, the module 114 takes into account forward CH search spaces from each node at which the initial graph search stopped, and also the CH backward search space from the destination node. Thus, the search carried out by the CH query module is a many-to-one search. It will be appreciated that it is not necessary to finish the initial graph search before starting the CH many-to-one search, since the latter can be started from a node once the initial search has stopped at that node.

The CH reverse search space and the CH forward search spaces are computed using known techniques, and may be Dijkstra-based. It will be appreciated that the CH forward and reverse search spaces are generated using the precomputed data generated at precomputation time by the CH precomputation module 124

The CH query module 114 combines the CH forward search spaces and the CH backward search space so as to determine the shortest paths from each point at which the initial graph search stopped to the destination node. Combining forward and reverse search spaces to determine optimal routes is a well known aspect of CH and other bidirectional graph searches (e.g: bidirectional Dijkstra), and will not be described in detail here. In some embodiments, the CH query module may combine the forward search spaces to form a combined CH forward search space, and then determine meeting spots between the combined CH forward search space and the backward CH search space, thereby to determine the shortest paths.

In this way, the CH query module 114 computes shortest paths from each node at which the initial graph search stopped to the destination node in a many-to-one search. The shortest paths thus determined are then used to select the best route (ie: shortest path) from the source node to the destination node, taking into account the results of the initial graph search carried out by the initial graph search module 112.

Information relating to the determined route, for example text directions, estimated time of arrival and/or display of the route on a map) is then delivered from the system 102 to the client 104 and thus provided 216 to the user.

In some embodiments the initial graph search carried out by the module 112 may comprise a blending phase between the live traffic data and the predicted traffic data to avoid discontinuity in the traffic data at the boundary between the search space for the initial graph search and the combined CH forward search space. This may be achieved by modifying the costs on the graph for the initial graph search so that there is a continuous transition between live traffic data and predicted traffic data. In an embodiment, the costs on the graph may be modified by introducing time-dependent arc costs, ie: arc costs which depend on the departure time at the endpoint of the arc.

Those skilled in the art will appreciate that the nodes at which the initial graph search is stopped could in some embodiments be used as potential vias for a plurality of alternate routes which may be generated to give different route options to the user. An alternate in this case may be determined as the shortest path from the source to the via node, and then from the via node to the destination.

Moreover, it will be appreciated that CH is discussed above as a speed-up technique, alternatively any other hierarchical speedup technique (e.g: highway hierarchies) could be used. The CH technique is however particularly advantageous because it leads to small forward and backward search spaces.

Sharding

In some embodiments, e.g: involving large road networks, the graph of the road network may be sharded across multiple machines. General principles of sharding are well known per se. Reference is directed to Distributed Time-Dependent Contraction Hierarchies, T. Kieritz, D. Luxen, P. Sanders, C. Vetter, International Symposium on Experimental Algorithms (SEA 2010), May 2010, Ischia, Italy, available online at the time of writing at http://algo2.iti.kit.edu/english/1590.php.

According to various embodiments of the invention, additional nodes are included in shards so as to try to ensure that the initial graph search for the first part of a route can be run in the shard of the source node. Moreover, since forward and backward CH search spaces use CH shortcuts, they are relatively small. Thus, in embodiments, for each node in a shard, its forward and backward search spaces are stored in the shard too.

Figure 4:
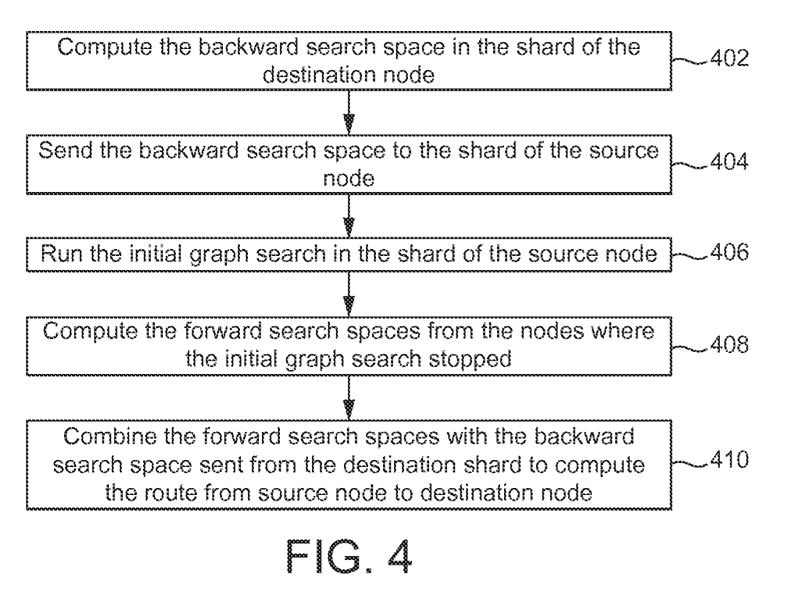
FIG. 4 illustrates functional steps of an exemplary multi-shard query.

FIG. 4 illustrates functional steps of an exemplary multi-shard query. As shown in 402, the backward search space is computed in the shard of the destination node. In 404, the backward search space is sent (e.g: via a remote procedure call (RFC) to the shard of the source node. In 406, the initial graph search (e.g: Dijkstra search) is run in the shard of the source node. Then, after the initial part, the algorithm switches to CH by computing 408 the forward search spaces from the nodes where the initial graph search stopped. In 410, the forward search spaces are combined with the backward search space sent from the shard of the destination node to compute the route from source node to destination node.

The nodes added so that the initial graph search can be run in the shard of the source node may be estimated rather than determined exactly. A good estimate can be obtained by including, in each shard, the Dijkstra search space for each point in the shard. This Dijkstra search space can be obtained by way of a Dijkstra search which stops according to the preset condition discussed above (e.g: based on 30 minutes of travel time), and which uses graph costs based on predicted traffic data, rather than live traffic data. Those skilled in the art will appreciate that as a result, the shards overlap.

Predicted traffic data is used for the estimate discussed in the previous paragraph because predicted traffic data is known prior to query time, whereas live traffic data is not known prior to query time. Thus, there may be differences between the search space included in the shard and the search space required for the query-time search. If, as a result, it is not possible to complete the query-time search in the shard of the source node, the CH forward search can be started early, ie: at nodes which have been settled by the initial graph search and which are included in the shard of the source node.

Thus, as will be appreciated from the foregoing, various embodiments of the present invention are advantageously compatible with large graphs, sharded over multiple machines.

Many modifications and variations of the route planning systems and methods described herein are possible.

For example, although multi-sharded implementations and/or implementations in the form of a web applications are discussed above, many alternative implementations are possible. For example, those skilled in the art will appreciate that in some implementations, route planning methods according to the embodiments of the invention may be operated by a mobile devices (e.g: a smartphone or a SAT NAV). Mobile routing applications in the context of contraction hierarchies are known per se and discussed for example in "Fast and Exact Mobile Navigation with OpenStreetMap Data", Diploma Thesis of Christian Vetter, Karlsruhe Institute of Technology, 2010, available online at the time of writing via the following link:

http://algo2.iti.kit.edu/routeplanning.php.

In some embodiments, the initial Dijkstra graph search may use CH to contract nodes that have no traffic coverage. This allows the initial graph search to skip over these nodes. Contracted Dijkstra algorithms are known per se and will not be described here. Reference is directed to Chapter 4.2 of "Systematic Combination of Speed-Up Techniques for exact Shortest-Path Queries", Diploma Thesis of Dennis Schieferdecker, Department of Informatics at the University of Karlsruhe, 2008, available online at the time of writing via the following link: http://algo2.iti.kit.edu/download/s-scsut-08.pdf, and to "Bidirectional Core-Based Routing in Dynamic Time-Dependent Road Networks", Daniel Delling and Giacomo Nannicin, ISAAC '08 Proceedings of the 19th International Symposium on Algorithms and Computation, Pages 812-823.

In some embodiments, the route planning query may specify one or more "via" locations in addition to the start and destination locations (for example, a user may request a route from Zurich to Berlin via Frankfurt). A route may be calculated from the start location to the destination location via the specified location(s) by carrying out a separate query for each consecutive pair of waypoints (e.g. from the source to the first via, from the first via to the second, etc).

Many other modifications and variations will be evident to those skilled in the art, that fall within the scope of the appended claims It will be appreciated that the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Unless specifically stated otherwise as apparent from the description above, it is appreciated that throughout the description, discussions utilising terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be understood that the process steps, instructions, of the present invention as described and claimed, are executed by computer hardware operating under program control, and not mental steps performed by a human. Similarly, all of the types of data described and claimed are stored in a computer readable storage medium operated by a computer system, and are not simply disembodied abstract ideas.

The present invention also relates to an apparatus for performing the operations herein. This apparatus may be specially constructed for the required purposes, or it may comprise a general-purpose computer selectively activated or reconfigured by a computer program stored on a computer readable medium that can be executed by the computer. Such a computer program are stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein can be executed by any type or brand computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein.

The invention claimed is:

1. A computer-implemented route planning method, comprising:
    determining, by one or more computing devices, source and destination nodes in a graph data structure based on a route planning query, wherein the graph data structure represents a road network;
    executing, by the one or more computing devices, an initial graph search on the graph data structure using graph costs based on real-time traffic data, wherein the initial graph search starts at the source node and settles nodes until it stops upon locating one or more nodes that are more than a predetermined travel time from the source node;
    computing, by the one or more computing devices, one or more routes to the destination node from one or more of said settled nodes using precomputed data based on traffic prediction data, thereby to determine a route from the source node to the destination node via one of said settled nodes, wherein the initial graph search comprises a blending phase between the real-time traffic data and the traffic prediction data such that costs on the graph for the initial graph search are modified so that there is a continuous transition between real-time traffic data and traffic prediction data; and
    providing, by the one or more computing devices, the route to a device for display to a user.

2. A computer-implemented route planning method as claimed in claim 1, wherein the precomputed data based on traffic prediction data is computed in a precomputation phase of a hierarchical speedup technique.

3. A computer-implemented route planning method as claimed in claim 2, wherein the hierarchical speedup technique comprises contraction hierarchies.

4. A computer-implemented route planning method as claimed in claim 2, wherein the hierarchical speedup technique comprises highway hierarchies.

5. A computer-implemented route planning method as claimed in claim 1, where the one or more routes to the destination node are computed based on a many-to-one graph search from a plurality of said settled nodes to the destination node.

6. A computer-implemented route planning method as claimed in claim 1, wherein computing one or more routes to the destination node comprises computing one or more routes to the destination node from one or more settled nodes at which the initial graph search stops, using precomputed data based on traffic prediction data.

7. A computer-implemented route planning method as claimed in claim 1, wherein the graph data structure is multi-sharded, and wherein additional nodes are included in one or more shards based on the predetermined travel time from the source node.

8. A computer-implemented route planning method as claimed in claim 1, wherein computing one or more routes to the destination node from one or more of said settled nodes comprises a bidirectional graph search.

9. A computer-implemented route planning method as claimed in claim 1, wherein the initial graph search comprises a Dijkstra-based search.

10. A system, comprising:
    one or more processors and one or more memory devices storing computer-readable instructions that when executed by the one or more processors cause the one or more processors to perform operations comprising:
    communicating with one or more client devices,
    generating a graph data structure based on map data, wherein the graph data structure represents a road network;
    determining source and destination nodes in the graph data structure based on a route planning query, wherein the determining comprises:
        executing an initial graph search on the graph data structure using graph costs based on real-time traffic data, wherein the initial graph search starts at the source node and settles nodes until it stops upon locating one or more nodes that are more than a predetermined travel time from the source node; and computing one or more routes to the destination node from one or more of said settled nodes using precomputed data based on traffic prediction data, thereby to determine a route from the source node to the destination node via one of said settled nodes, wherein the initial graph search comprises a blending phase between the real-time traffic data and the traffic prediction data such that costs on the graph for the initial graph search are modified so that there is a continuous transition between real-time traffic data and traffic prediction data;

providing the route to a device for display to a user.

* * * * *